United States Patent [19]

Mongiello

[11] 4,112,835
[45] Sep. 12, 1978

[54] CHEESE PROCESSING SYSTEM

[76] Inventor: Angelo Mongiello, 820-62nd St., Brooklyn, N.Y. 11220

[21] Appl. No.: 770,107

[22] Filed: Feb. 18, 1977

[51] Int. Cl.² .............................................. A23C 3/04
[52] U.S. Cl. ...................................... 99/455; 99/466; 99/484
[58] Field of Search ................. 99/455, 452, 453, 459, 99/456, 460, 461, 462, 466, 484

[56] References Cited

U.S. PATENT DOCUMENTS

| 2,370,920 | 3/1945 | Schaub | 99/455 |
| 2,899,317 | 8/1939 | Hensgen | 99/455 |
| 3,242,571 | 3/1966 | Langford | 99/456 X |
| 3,295,205 | 1/1967 | Sjoholm | 99/466 |
| 3,805,689 | 4/1974 | Berger | 99/484 |

Primary Examiner—Edward J. McCarthy

Attorney, Agent, or Firm—Paul J. Sutton

[57] ABSTRACT

The present invention discloses and provides a fully automatic continuous processing system and apparatus for producing fibrous cheeses of the pizza or mozzarella type, either for immediate consumption or for use in preparing other products. The system has been designed in a modular form such that benefits associated with each component part of the system may be selectively acquired, without the need to acquire the entire system itself at one time. Means are provided for milling curd, accumulating the curd and then cooking it, conveying the cooked product to molding means, automatically molding and form cooling the product in apparatus that positively ejects same to a cooling and/or brining bath, salting the cheese product, and automatically vacuum packaging same in known commercial vacuum packing machines for delivery.

2 Claims, 12 Drawing Figures

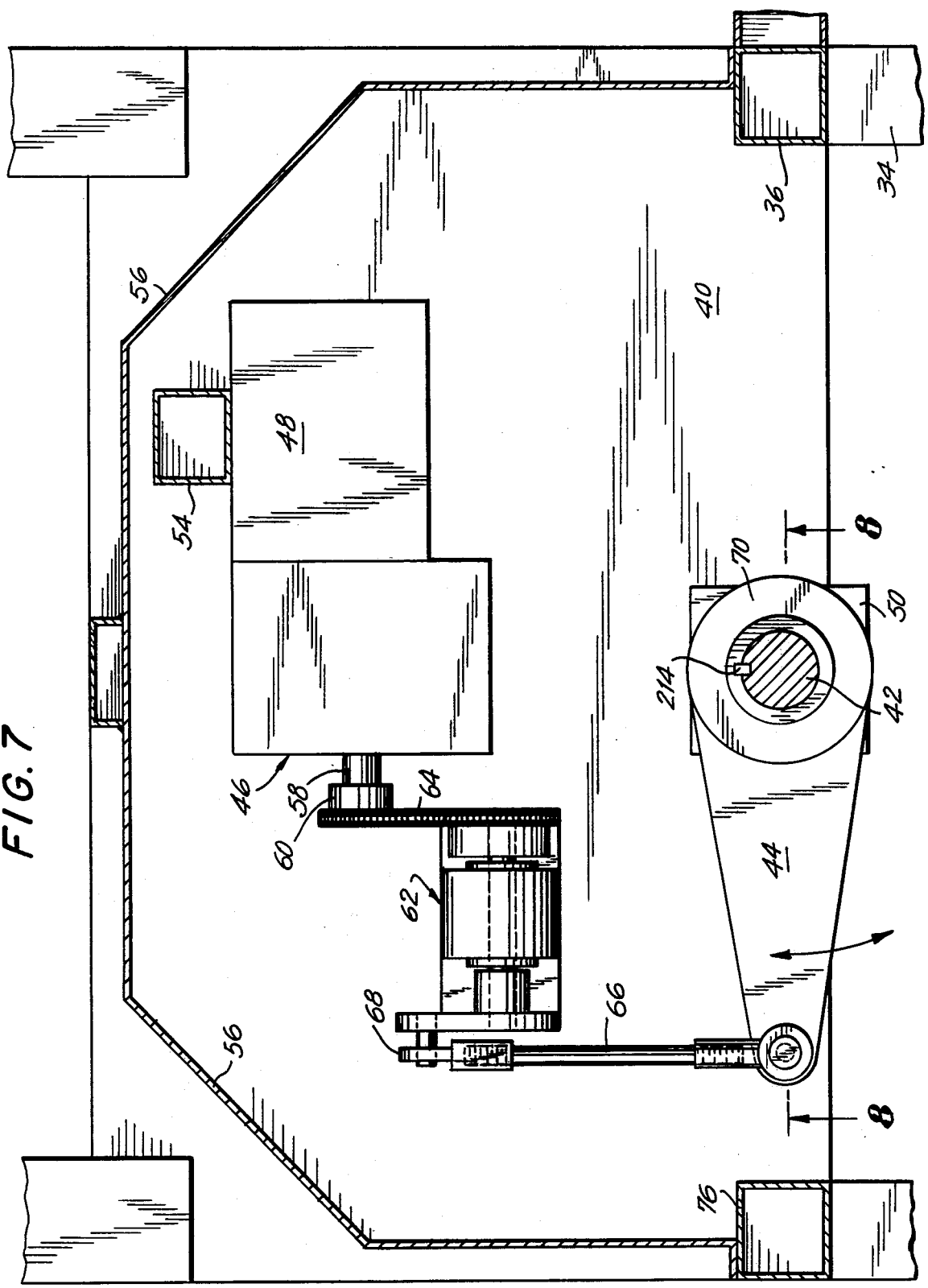

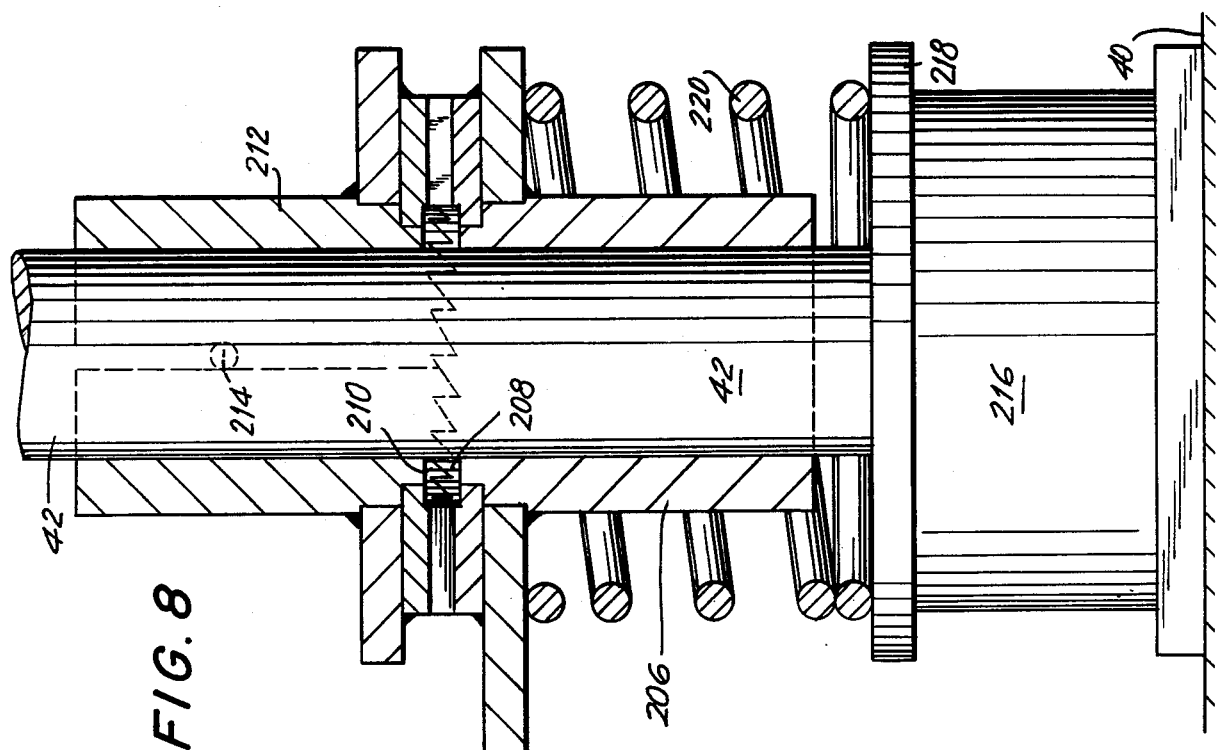
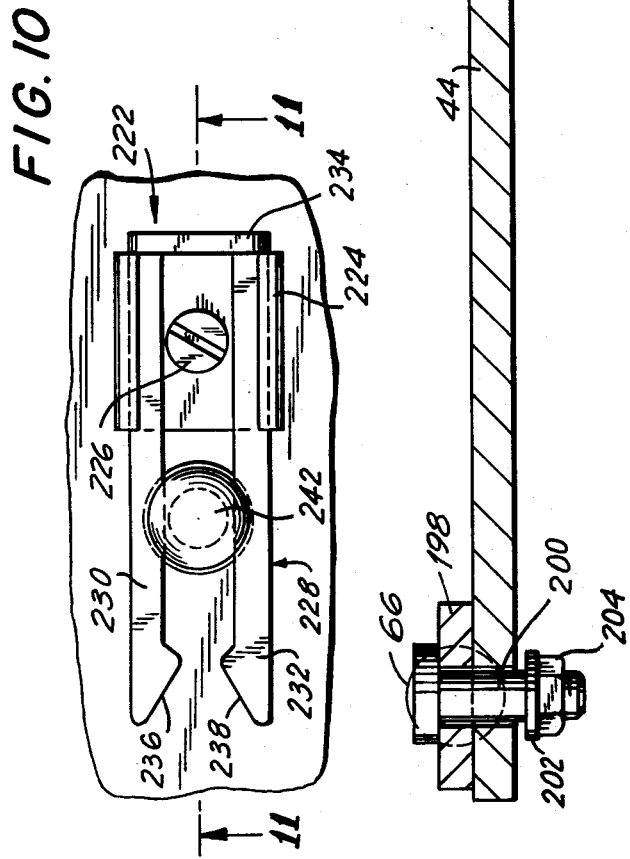
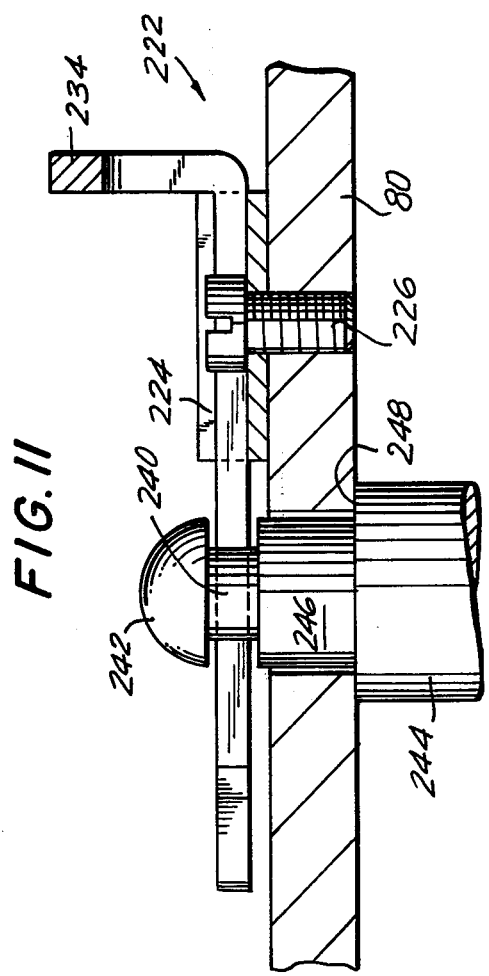

CHEESE PROCESSING SYSTEM

The present invention relates generally to cheese processing methods and apparatus, and more specifically to an automated system and apparatus for producing mozzarella cheese and/or pizza cheese.

The Italian cheese industry has enjoyed considerable success with the production and sale of cheeses of the pasta filata or mozzarella type over the years. These are not new products and the demand among a variety of ethnic groups other than Italian and Italian-American have required increased production by manufacturers of these cheeses, thus raising prices of raw milk, labor and cost of materials, making it necessary to produce a pound of cheese for less or else its price would become prohibitive. It is hard not to notice the proliferation of food establishments which serve pizza and similar products, not only in the major cities but in the suburbs and rural areas as well. This segment of the fast-food industry has likewise enjoyed considerable success by selling to members of families whose schedules dictate a desire to minimize the time traditionally associated with a home-cooked meal.

I suppose historians and psychologists will argue back and forth for years to come concerning the effects of the fast-food industry upon our social and family lives. It is not my purpose here to expound upon these areas, and yet I will not let the opportunity pass without voicing my pleasure in sharing a meal in the relaxed comfort of those close to me. However, a number of observations are quite obvious to me as one who has seen the Italian cheese industry grow over the years.

The reader must first be informed that the Italian cheese industry is deep rooted with a style, traditions and methods and procedures which go back centuries in time. In fewer and fewer areas of the world, one may still see cheese produced with the aid of the traditional wooden paddles and implements known to those of us whose family background is steeped in rich tradition. These same methods and procedures have been modified in varying degrees over the years in order to facilitate and accommodate larger production capabilities associated with supplying great quantities of mozzarella cheese, for example. However, it is interesting to note that this industry which has been steeped in the aforementioned rich traditions has lagged somewhat behind countless other industries whose desire for increased profits have resulted in the use of more and more sophisticated automated production equipment.

I am sure many cheese businesses which have grown from small family businesses have repeatedly struggled with the notion of sacrificing familiar traditions to the less personal machinery and apparatus required to generate huge quantities of product. Struggles such as these are evidenced by the marriage of old ways with new equipment seen in many facilities throughout the country. However, as the younger members of families who own or control cheese producing businesses in this country are becoming more responsible for dictating the future trends of these companies, there is an increasing desire growing throughout the Italian cheese industry to not only increase earnings, but to enjoy the benefits of the more efficient production systems proposed by myself and others through quality control plus conforming with federal, state and municipal health and safety laws.

For decades now I and members of my family have provided innovations which, by their nature, seek to marry the traditions I have referred to above with the technology and know-how available in this country. My efforts are not directed to giving up the traditions being referred to, but to enable producers of Italian cheese to reach yet larger segments of the population with a product having the taste and other desirable characteristics enjoyed by many of us for years. This will only become possible with the realization that more sophisticated technology is required to be implemented within the cheese system. With labor costs and problems increasing, the general and overall cost of facilities has skyrocketed.

Of course, what I am referring to here has not gone unnoticed by a number of suppliers of cheese processing equipment. Many efforts have been made to design equipment that attempts to solve a number of problems associated with the proper manufacture or production of Italian cheese. I am sorry to say that a number of suppliers of cheese processing equipment have chosen to borrow a number of my own designs, without permission, in the quest to provide customers with equipment that solves these problems.

It is shocking in this day and age to visit facilities which utilize conventional equipment wherein personnel still hand-transfer cheese from equipment to plastic molds with a number of cavities, for cooling and shaping the cheese so as to attempt to wind up with product suitable for automatic packaging machines. One need not be a genius to realize that the use of a number of different personnel with different characteristics and habits necessarily results in non-uniform product having a variety of shaping tolerances.

Another result of conventional equipment known to the industry resides in the use of elevated temperatures to cook the cheese curd in known or conventional cooking apparatus. The use of such high temperatures has traditionally driven fats and moisture from the cheese product, with the result that the fat flows into and contaminates the cooking water system and, if separated by the user, draws a far lower price per pound than the fat contained within the cheese product itself. Of course, since cheese is sold by the pound, the higher the fat and moisture content of the product, the greater the monetary gains enjoyed by the producer. My visits to a number of cheese processing plants have resulted in my witnessing average cooking temperatures of approximately 170° F.

Another drawback of conventional cheese processing equipment is an inability to properly cook or heat the cheese before kneading. Conventional machines knead and mesh cheese together into globs by an overworking of the cheese which drives fat from the cheese into the cooking water. The present invention, as will be seen below, does not stretch or put the cheese together until a sufficient time has passed with cut curd wherein the cheese absorbs the heat from the water temperature. With the present invention, therefore, we are able to enjoy a cheese product in its natural state whereby heat is uniformly and evenly absorbed.

It is an object of the present invention to provide an automated cheese processing system.

Another object of the present invention is to provide an automated cheese processing system which utilizes one or more of a series of pieces of equipment which may be utilized with the user's existing or conventioanl equipment in areas where greater accuracy in weights, shapes or sizes during production are needed.

Still another object of the present invention is to provide a cheese processing system, as above, wherein cheese product is produced in an automatic molding and form cooling system which automatically accepts cooked cheese and which positively ejects same to a predetermined location.

A further object of this invention is to provide a cheese processing system whereby a molding/form cooling system which operates at between one and one and a half revolutions per minute only accepting cooked cheese within interchangeable and preselected forms or molds within which cheese product may be formed in shapes that may be held to rather close tolerances when discharged by the positive-eject system described below.

A still further object of the present invention is to provide an extremely efficient cheese processing system which employs one or a series of apparatus available singly or in numbers, and which affords the user a process capable of yielding increased moisture and fat content within the product with increased production.

Yet another object of the present invention is to provide a cheese processing method and apparatus capable of meeting FDA sanitary codes as well as USDA requirements.

According to one aspect of the present invention, a molder/form cooler apparatus known as a hopper feeder is provided which receives cooked cheese from either a cooker described herein or an accumulator described herein or, in the case where the user of this equipment is utilizing his own cooking equipment, the existing cooker on his or its premises. The cooked cheese is elevated through an inlet opening formed in a severing plate and thereafter through openings within a base plate of the molder/form cooler table which immediately overly the general inlet opening. The cheese is forced upwardly under a predetermined but controlled pressure such that the cheese enters each of a number of tubes or forms, each of which is secured at its base to the inlet openings such that the upward force of the cheese entering the tubes or forms causes plunger plates contained therein to be contacted and accordingly elevated. Posts integral with these plunger plates are likewise elevated to a predetermined maximum elevation which is dictated by the respective lengths of sleeves, described in detail below.

Once the confines of these tubes or forms below the plunger plates are filled with cheese, there is no compression of the cheese that has already entered the molds or forms since excessive pressure would force moisture and fat from the cheese product. Throughout this process being described, the head or table of the molder/form cooler is rotating at a predetermined and selected speed in a rotary intermittent-type movement of approximately between one and one and a half revolutions per minute, yet yielding unmatched productivity. Drive means situated below this rotating head selectively control the speed of rotation as well as the conveying characteristics of the cooked cheese being elevated to the molder/form cooler. As each opening with its associated tube or form and its associated plunger plate rotates into a position above the inlet opening, the tube or form receives cooked cheese in a manner to be described.

As soon as the cheese enters the forms or tubes, a cooling process takes place whereby heat within the cheese is transferred through the walls of the tubes or forms to a circulating and surrounding reservoir of fluid maintained at a controlled desired temperature within the chamber. Thus, during this time as the form with the cheese therewithin rotates from the inlet opening in a preferably clockwise direction until it overlies an outlet opening, tripping a switch which activates an air cylinder thus moving cheese out of the mold to a wash or brine tank, a considerable amount of heat is transferred from the cheese within the forms such that the product is able to maintain the internal shape of the form within which it is contained, to relatively close or tight tolerances. More specifically, once the cheese enters the tubes or forms, the side shapes of the product are defined by the inner contours of the inner tubes or forms. The upper end of the product and its shape is defined by interference with the plunger plates associated with each of the tubes or forms. The shape of the lower end of the product is first defined by a severing action between a moving lower plate and a severing plate which is kept stationary.

Once the tubes containing cheese product that has been formed, molded and cooled reach a point of clockwise travel whereby the subject tubes overly the outlet opening, an ejecting assembly automatically is caused to be lowered as a result of hydraulic or air pressure within a cylinder. The downward moving of an ejecting plate results in contact between the ejecting plate and uppermost extremities of the aforesaid posts associated with the tubes or forms. The result is a downward ejecting movement of the plunger plates with the resulting forcing of the molded and form cooled product within the tubes through and out from an outlet opening. In a preferred embodiment of this invention, molded and form cooled product is ejected positively from the molder/form cooler into a cooling bath where product is yet further cooled on its way to further processing. This bath may also be a brine bath.

What has just been described merely relates to the molder/form cooler aspect of the present inventive system, and the reader is advised that other features of the system disclosed within the drawings and specification may be described in more detail in related patent applications more specifically directed to the structural features of each piece of equipment within the system.

My invention will be more clearly understood from the following description of specific embodiments of the invention, together with the accompanying drawings, wherein similar reference characters denote similar elements throughout the several views, and in which:

FIG. 1a is a view similar to that described for FIG. 1, wherein a cooling tank which may contain brining fluid is shown as a substitute piece of equipment for a cooling tank shown in FIG. 1;

FIG. 7 is a fragmentary sectional plan view taken along line 7—7 of FIG. 2;

FIG. 8 is a fragmentary sectional elevational view taken along the line 8—8 of FIG. 7;

FIG. 10 is an enlarged plan view of a locking clip assembly associated with the molder/form cooler shown in FIG. 2; and FIG. 11 is a fragmentary sectional elevational view taken along the line 11—11 of FIG. 10.

Figure 1:
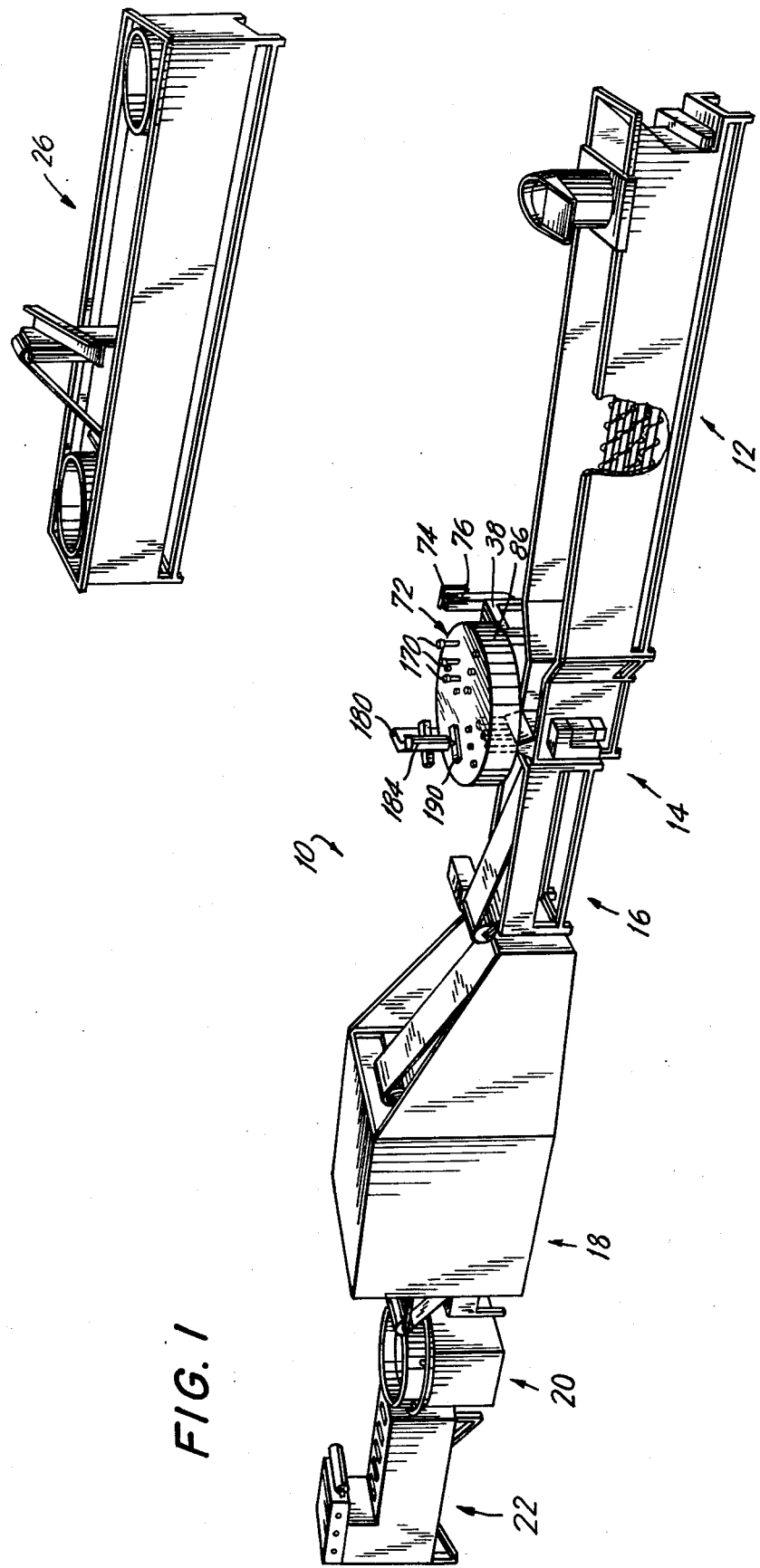
FIG. 1 is a pictorial perspective-type view of a number of pieces of equipment comprising the cheese processing system according to the present invention.

Referring now in detail to the drawings, FIG. 1 in a fragmentary-type perspective view illustrates in a perspective view a number of novel pieces of equipment that comprise a system for producing cheese. The equipment shown in FIG. 1, because of the size of the view, has been represented in pictorial rather than realistic illustration, in order to describe the system as a whole, before looking in detail at each piece of equipment that comprises the system. The over-all system has been designated reference character 10.

System 10 provides the user with a continuous processing system for producing fibrous cheese of pizza or mozzarella types, for either immediate consumption or for use in preparing other products. It must be emphasized at this point in the specification that producers of cheese are able to acquire by purchase or otherwise one or more separate components of system 10 for use with their existing equipment, or they may acquire the entire system. System 10 has purposefully been designed in a modular form such that benefits associated with each component part of system 10 may be selectively acquired, without the need to acquire the remaining equipment comprising the over-all system. However, of course, it will be obvious after a reading of this specification that perhaps the most substantial benefits known to the industry will be far surpassed by parties who acquire and use the over-all system, as shown.

In FIG. 1, system 10 is shown to include a cooker 12 which is removably secured to and aligned in series with a high-speed molder/form cooler 14 which, in turn, is aligned with a cooling tank 16. Cooling tank 16, in turn, is cooperatively aligned with a briner 18 which discharges brined product onto a table 20 which supplies product to a packaging machine 22.

Basically speaking, system 10, together with other novel pieces of equipment which are not shown in the drawings, operates in a manner which greatly minimizes labor requirements by providing a substantially automatic cheese processing system which delivers to the user a superior product containing greatly increased percentages of moisture and desirable fat content. Cooker 12 accepts curd from a curd mill (not shown) and cooks the curd while transferring same to molder/form cooler 14 which, in turn, molds the cheese that has been cooked into a form desired by the user while simultaneously cooling this formed cheese before delivering it to a fluid bath within cooling tank 16, where the molded cheese is yet further cooled in its pre-selected shape. The molded and now cooled cheese is delivered by a conveying system to the confines of briner tank 18 where predetermined quantities of salt are added in a novel manner to the molded product. Salted product is thereafter delivered to a rotary sorting/delivery table which provides automatic packaging machine 22 with the product such that same may may be automatically wrapped and packaged for either storage or immediate delivery.

Figure 2:
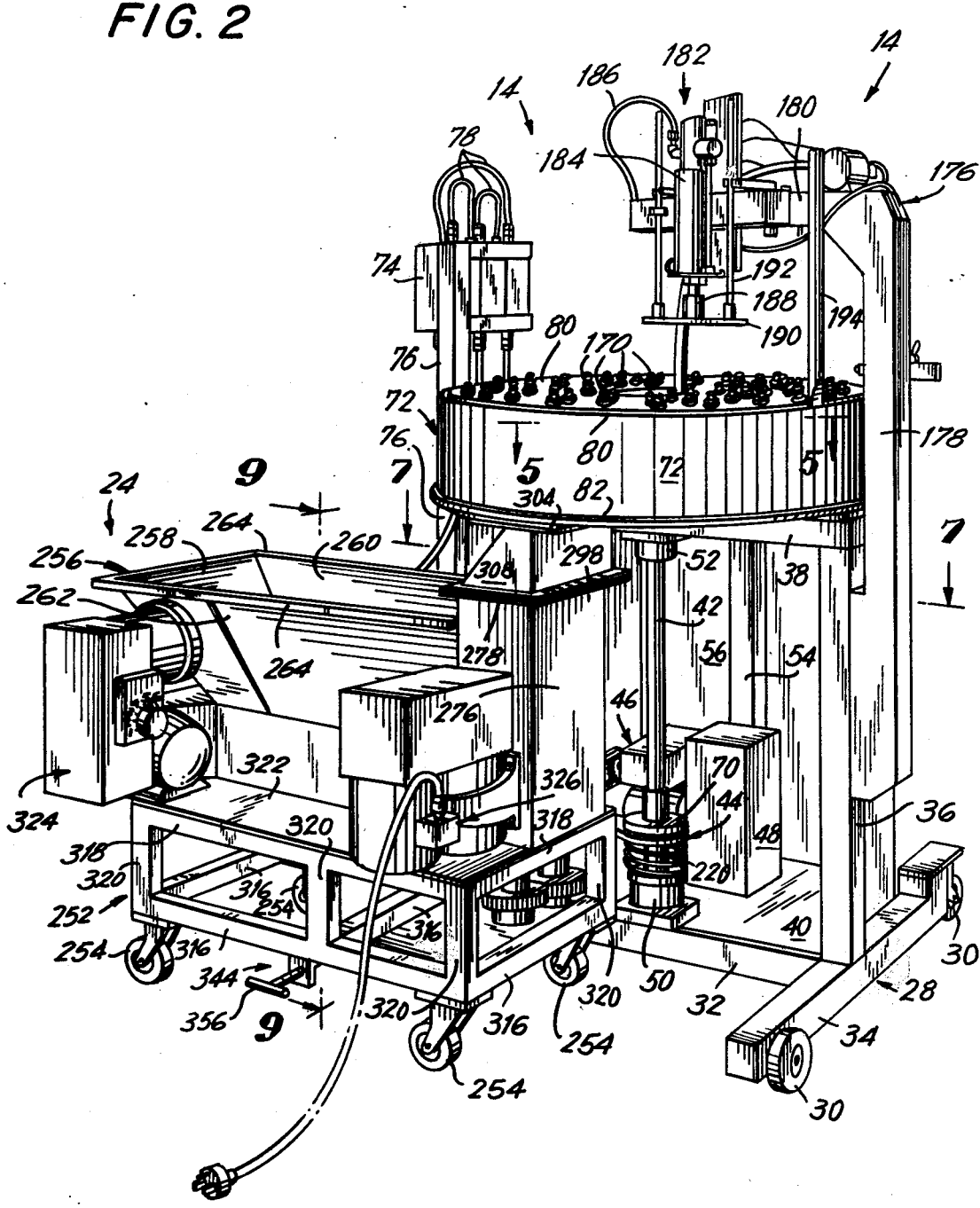
FIG. 2 is a perspective elevational view in which an accumulator is shown cooperatively connected to a molder/form cooler, according to the present invention.

While a cooker 12 has been shown in FIG. 1 as comprising part of the system 1, the present invention provides a system capability of utilizing an accumulator 24 in conjunction with molder/form cooler 14, as best seen in FIG. 2. The idea of providing an accumulating tank or accumulator 24 is to enable the user of system 10 or components thereof with existing cooking equipment that may already be owned by the user who, at the time of acquiring system 10, may not be in a position to expend the additional monies required for cooker 12, as opposed to accumulator 24. Cooker 12 provides all of the benefits and yet additional benefits normally provided by the user's existing or conventional cooker, together with the benefits provided by accumulator 24. Again, the modular concept enables a degree of flexibility unheard of before in the cheese-producing industry.

I will once again here stress a primary benefit of system 10 in that it provides the user with a continuous and fully automatic process for cooking, molding, form-cooling, brining and packaging what is commonly referred to as mozzarella cheese at rates in excess of 90 pieces per minute, each piece of cheese being the exact size, configuration and weight desired by the customer or user thereof. It is also contemplated that this product is vacuum packaged by means of packaging machine 22. Throughout the various steps performed in the process associated with system 10, cheese product is conveyed in an indexed and substantially linear motion between each operation making up the system, from cooking through to vacuum packaging. FIG. 1a illustrates a cooling tank 26 which is able to replace tank 16 in alternate embodiments of the system 10, as will become apparent from a reading of the following specification and the specifications of related patent applications which are contemplated for describing in greater detail those pieces of equipment which comprise system 10 but are not fully disclosed in the present specification. The present specification will deal primarily with the molder/form cooler 14 and either of its associated cooker 12 or accumulator 24.

The reader is now referred to FIG. 2 wherein the combination of accumulator 24 and molder/form cooler 14 are shown in a perspective-type view in cooperative engagement with one another. A frame 28 of molder/form cooler 14 is movably supported upon wheels 30 such that the entire assembly 14 may be moved to and from selected locations within the user's plant. Frame 28 basically consists of joined horizontal frame members 32 and 34 which support vertical frame member 36 in a manner which enables the cantilevered interconnection between the base of frame 28 and horizontal support member or shelf 38.

A substantially horizontal platform 40 which is raised above the floor or surface upon which wheels 30 rest, in turn, supports a motor-driven vertically extending shaft 42 by means of a connecting plate 44. Power is supplied by means of a geared motor assembly 46 whose speed is variable and controllable by the user by means of control means shown in block form in FIG. 2 by means of reference character 48.

Shaft 42 is journalled within a lower bearing assembly 50 and extends upwardly from this bearing assembly to an upper bearing assembly 52. In addition to providing the bearing support for shaft 42, bearing assemblies 50 and 52 further provide alignment and means for holding the shaft during its rotation in a preselected manner with respect to horizontal shelf 38 and its supports 36 and 54. A vertical protective curtain 56, which may be removable by the user, isolates the mechanisms supported by platform 40 from the clothes of the user and from other contaminants, while simultaneously providing a more pleasing appearance to molder/form cooler 14.

FIG. 7, which is a partial fragmentary sectional plan view taken along line 7—7 of FIG. 2, illustrates in a bit more detail and in an enlarged view some of the components situated upon platform 40. For example, we see in FIG. 7 that the output shaft 58 of motor assembly 46 supports a sprocket wheel 60 which, in turn, is interconnected with the input side of gear box 62 by means of a chain 64. Intermittent rotary movement of shaft 42 is facilitated by means of a connecting rod 66 of variable and adjustable length which interconnects the geared output 68 associated with gear box 62 with a connecting plate already designated reference numeral 44. Connecting plate 44 comprises but a link in the driving system powered by motor assembly 46, cooperatively coupled with a ratchet assembly 70 which interconnects plate 44 and shaft 42 by means of a keyed coupling having a key 214.

As the double-headed arrows within FIG. 7 suggest to the reader, the back-and-forth movement of plate 44 provide an intermittent movement of shaft 42 such that shaft 42 delivers the same intermittent movement to a molding/form cooling head assembly 72.

In a preferred embodiment of the present invention, head assembly 72 is driven by means of shaft 42 through a horizontally disposed gear (not shown) which contacts a sprocket chain extending annularly about the circumference of the base of molding head assembly 72. While the rotary speed, already described as intermittent, of head assembly 72 has been described as in some manner depending upon control means 48 supported upon platform 40, the controls that are electrically interconnected with motor assembly 46 and which are accessible to the user terminate in a junction box 74 supported by a vertical member 76 at an elevation easily accessible to the operator of the equipment. Junction box 74 and its associated switching mechanisms and control buttons are all fed by means of electrical wiring generally designated with reference character 78. Any number of methods or means of controlling the operation of molder/form cooler 14 and the components thereof are contemplated by this invention and it must be kept in mind that departures from the specific embodiments preferred and disclosed within this specification are also contemplated as coming within the scope of the present invention. This is likewise true of other components being described.

Molding head assembly 72, also known by various other names to me, such as rotary molding table assembly, etc., is supported by means of horizontal shelf 38, which has already been described as being interconnected with vertical frame member 36. Assembly 72 consists of a rather novel and interesting combination of components that will now be described in a bit more detail.

Figure 4:
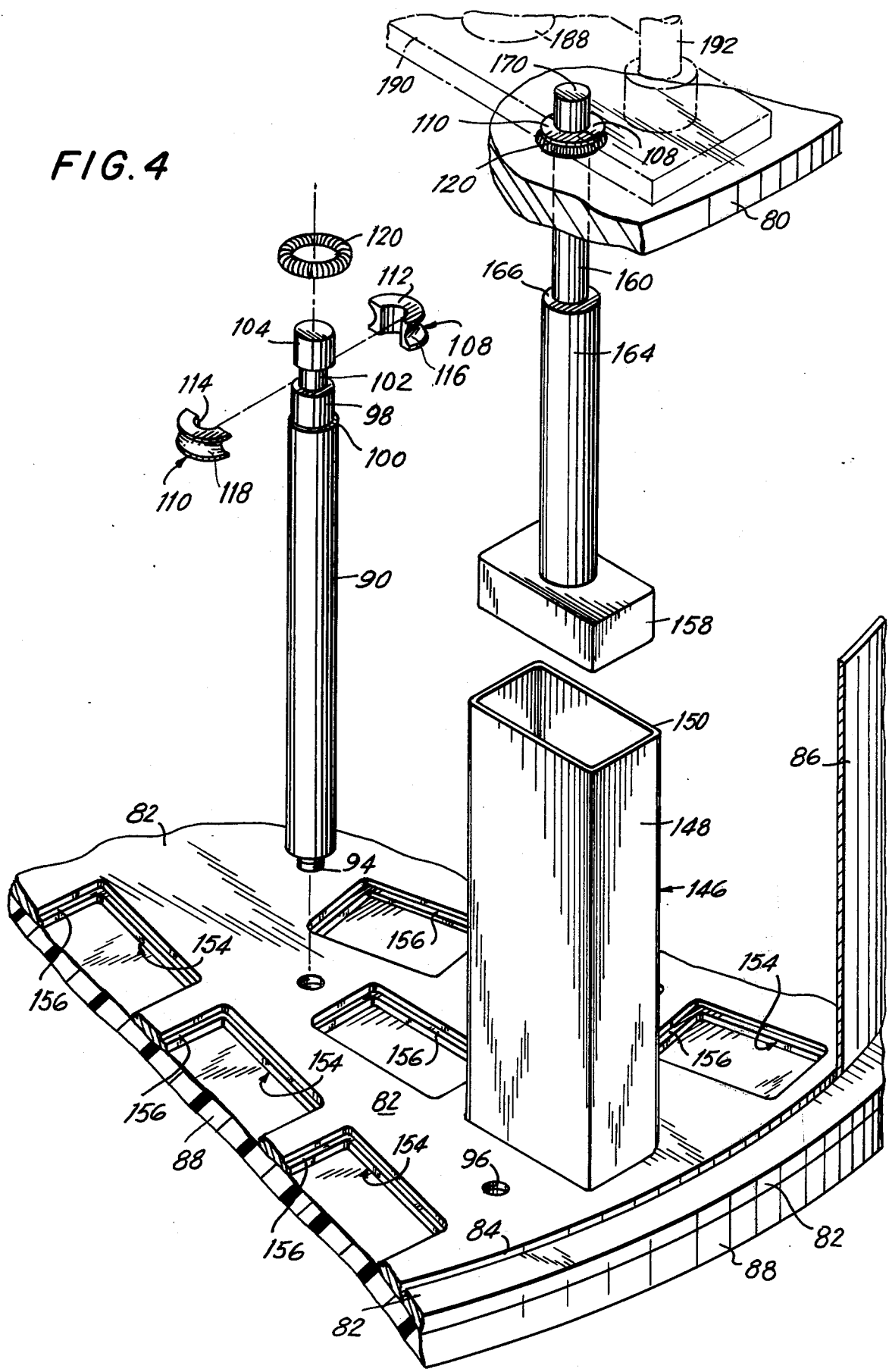
FIG. 4 is a fragmentary exploded perspective view illustrating a portion of the molder/form cooler shown in FIG. 2, and specifically illustrating portions of the tubes or forms and the associated ejecting assembly.

Assembly 72 includes an upper plate member 80 disposed in a substantially horizontal plane and which is spaced from a lower support plate 82. In FIG. 4 it is seen that lower plate 82 is formed with a circumferential groove 84 within which a vertically extending annular containing wall 86 fits and is supported. The fit between wall 86 and the surfaces defining groove 84 within lower plate 82 is substantially fluid-tight, the purpose of which will become more apparent from the description below.

Immediately underlying and contacting lower support plate 82 is a severing plate 88, which is disposed in a horizontal plane and in contact with the bottom surfaces of plate 82. Severing plate 88 is stationary and fixedly supported, while lower plate 82 slides along the upper surfaces of severing plate 88.

Upper and lower plates 80 and 82 are held together with curtain or vertical wall 86 by means of a plurality of vertically upstanding posts 90, which are spaced about assembly 72 in positions which assure maximum structural integrity and proper securement of plates 80 and 82 together with wall 86. The combination of plates 80 and 82, together with wall 86, provide a fluid chamber 92 within their confines.

In a preferred embodiment of the present invention, posts 90 are formed with threaded lower ends 94 which threadedly or matingly engage capped openings 96 formed in but not through lower plate 82. The upper ends of posts 90 include a stepped section 98 of reduced diameter integral with a greatly reduced diameter portion 102 which, in turn, is integral with an end portion 104 having a diameter substantially equal to section 98. The shoulder 100 formed by the reduction in diameter between section 98 and the full diameter portion of post 90 becomes quite useful when posts 90 are assembled, as best seen in FIG. 6, which is a fragmentary sectional elevational view.

Figure 6:
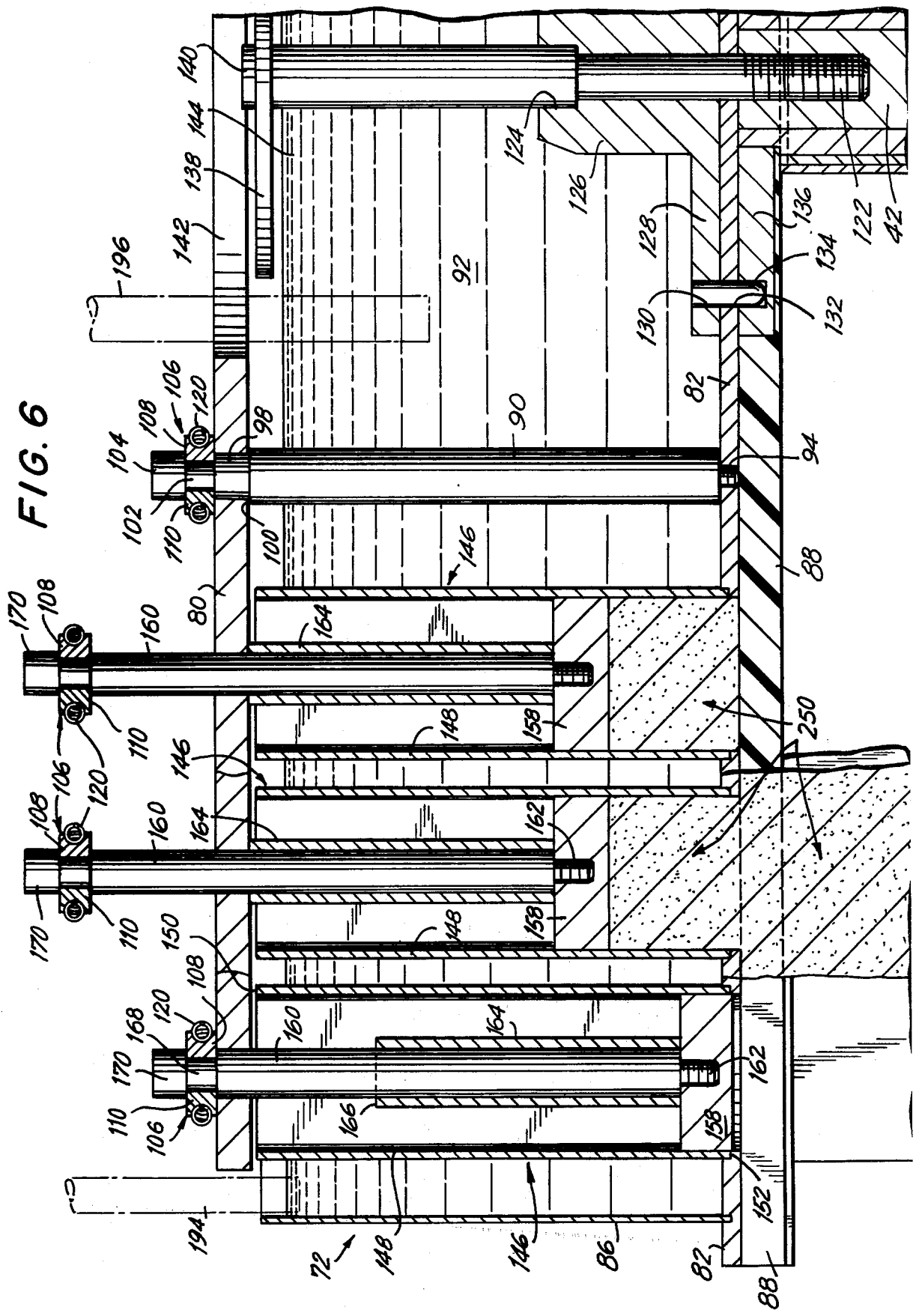
FIG. 6 is a fragmentary sectional elevational view taken along the line 6—6 of FIG. 5.

In FIG. 6 we see that, in the assembled condition, posts 90 have their threaded lower ends 94 threaded to the female threads of openings 96 formed in lower plate 82. Upper plate 80 rests upon shoulders 100 associated with posts 90 and is kept in the position best seen in FIG. 6 by means of spring-biased retaining assemblies 106. FIG. 4 illustrates retaining assemblies 106 as each including two ring-shaped halves 108 and 110 formed with internal grooves 112 and 114, respectively. Halves 108 and 110 are further formed with external grooves 116 and 118, respectively, about the outer surfaces thereof.

When assembled with post 90, halves 108 and 110 come together to form a complete arcuate ring, with internal grooves 112 and 114 surrounding reduced diameter portion 102. Halves 108 and 110 are prevented from becoming separated and thus releasing upper plate 80 from posts 90 by means of a substantially circular retaining spring 120 which, in a preferred embodiment of the present invention, comprises a helically wound spring. Thus, when assembled, plate 80 is unable to be removed from posts 90 which have been properly secured to lower plate 82 as a result of the interfering presence of spring-biased or retaining assemblies 106, which have properly been secured to the uppermost extremities of posts 90.

Figure 5:
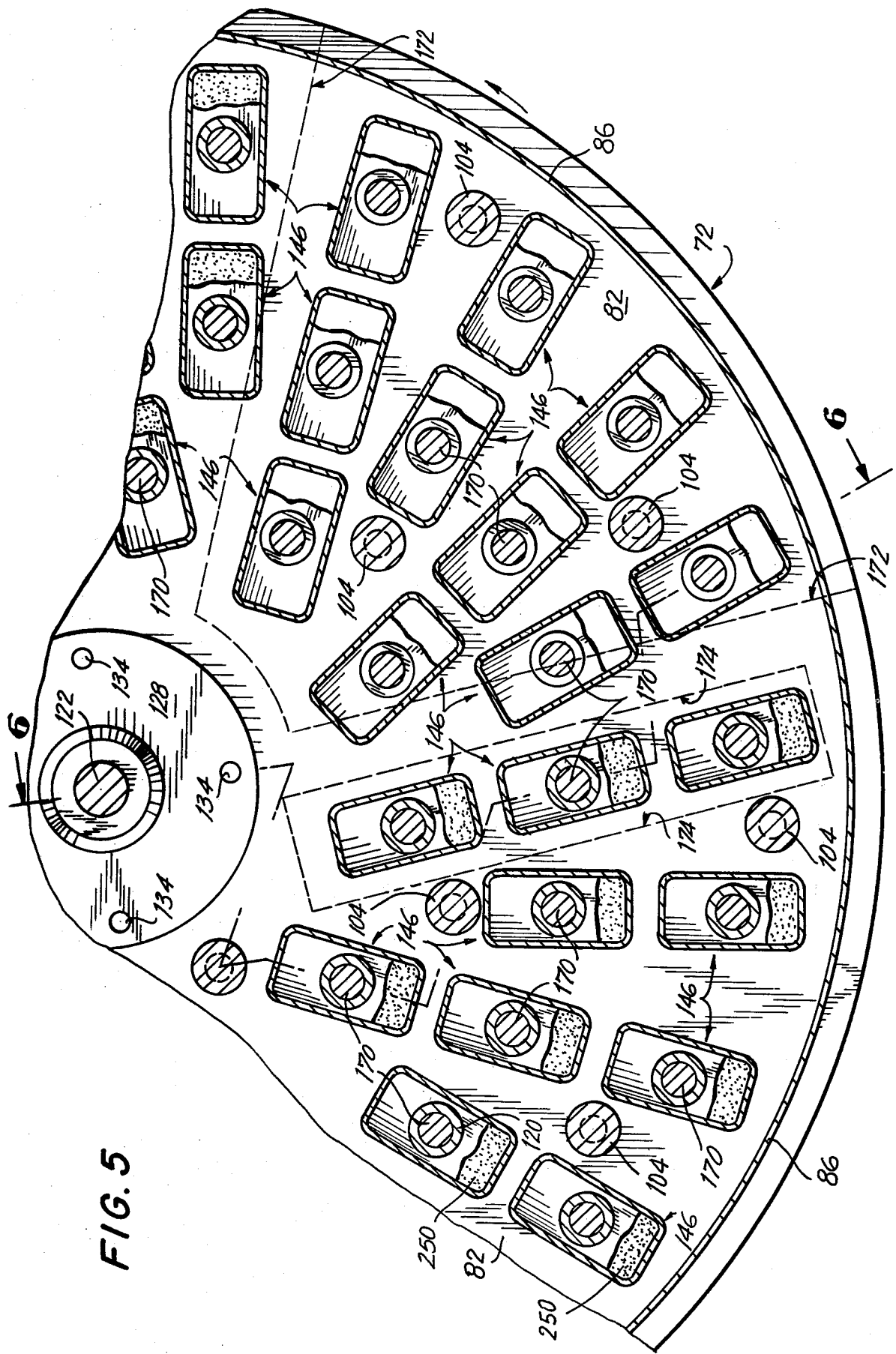
FIG. 5 is a fragmentary sectional plan view taken along the line 5—5 of FIG. 2.

The interconnection of assembly 72 and shaft 42 such that the intermittent rotational movement of shaft 42 will result in likewise movement of the entire assembly 72 is accomplished, in a preferred embodiment of this invention, as best seen in FIGS. 5 and 6. Looking at FIG. 6, shaft 42 is threadedly engaged by a downwardly extending threaded rod 122 which extends through a counterboard opening 124 formed in a central hub 126. Hub 126 is formed with a substantially radially extending flange 128 which, in turn, is formed with a plurality of holes 130, preferably four, which are equally spaced about the central axis of hub 126. A like number of holes 132 formed in lower plate 82 are formed through this lower plate on the same hole circle such that they may line up and, when they do, pins 134 serve to index flange 128 with lower plate 82. A bearing collar 136 disposed below and in contact with the lower surfaces of lower plate 82 is likewise formed with a plurality of openings adapted to accept pins 134 such that smooth rotary movement of lower plate 82 and collar 136 is facilitated, with respect to the relatively stationary severing plate 88. A flange 138 extends radially from the upper extremities 140 of rod 122 such that same may be gripped by the hands or tools of the user in order to unscrew or remove rod 122 from shaft 42. A substantially central opening 142 formed in the central portion of upper plate 80 facilitates access to flange 138 and serves a further purpose as will be described in more detail below.

As can be seen in FIG. 6, a quantity of fluid may be and is contained in a pre-selected and circulating manner within chamber 92. Reference number 144 has been arbitrarily chosen to designate the fluid shown in FIG. 6 and contained within chamber 92.

Looking now at other features of assembly 72, a plurality of metal tubes or forms 146 of a preselected cross-sectional shape are spaced and located about the central axis of rod 122 and within chamber 92, as best seen in the cross-sectional plan view of FIG. 5 and the fragmentary elevational view of FIG. 6. The inner cross-sectional shape of tubes or forms 146 corresponds to the over-all cross-sectional shape of the cheese product desired by the user. Tubes or forms 146 are removable and interchangeable with other tubes or forms of other and predetermined shapes corresponding to alternate choices of product cross-sections desired by the user of the equipment or system 10, or same's customers.

The choice of metal as the material has been chosen because of the favorable heat transfer properties of metal over other insulating materials. Tubes 146 are preferably formed of stainless steel having corrosion-resistant characteristics. It is also contemplated by the present invention to provide the plurality of tubes or forms 146 in identical form and dimensions such that same may be interchangeable in order to reduce what might otherwise be complications in assembly within chamber 92, when fully assembled.

Each tube 146 includes a wall 148 which extends between ends 150 and 152. Tubes 146 may be of an extruded form or may be fabricated, such as by welding, and ends 150 and 152 may be identical such that the orientation of the tubes when assembled is not critical as to upper and lower ends being reversed. Lower ends 152 of tubes 146, when assembled, fit within openings 154 formed through lower plate 82. In a preferred embodiment of this invention, openings 154 are counterbored such that a ledge 156 is provided in each case to accept the surfaces of lower ends 152 of tubes or forms 146. When assembled on ledges 156 of openings 154, as best seen in FIGS. 4 and 6 of the drawings, tubes or forms 146 and ledges 156 provide a relatively fluid-tight seal therebetween, such that fluid within chamber 92 is unable to escape through openings 154.

The molder/form cooler 14 incorporates what I have referred to commercially as a positive eject process, whereby cheese molded and formed within tubes or forms 146 is positively ejected from these forms as will be described in more detail below. This positive ejection provides an efficient and reliable means whereby the tubes or forms 146 are evacuated of cheese such that they are able to accept a new quantity of cheese to be molded and formed on a continuous basis. This positive ejection is accomplished by means of a plurality of plunger plates or pistons 158, with each tube or form 146 accepting a plunger 158. The cross-sectional shape of plunger plates 158 correspond and substantially match the cross-sectional shape of the inner surfaces of walls 148 of tubes or forms 146, such that the outer surfaces of plunger plates 158 engage the inner tube surfaces. A plunger post 160 formed with a lower threaded end 162 is threaded into the upper surfaces of each of plunger plates 158, such that we have a plunger post 160 associated with each plunger plate 158. A sleeve 164 surrounds the lower portions of each of plunger posts 160 and extends upwardly from a point of contact with plunger plate 158 and the upper surfaces thereof, to an upper end 165 of sleeve 164.

The uppermost ends of each of plunger posts 160 are formed in a substantially identical manner as has already been described for each of posts 90 hereinabove. This is done so as to enable the use of springbiased retaining assemblies 106 in association with posts 160 as well as posts 90. More specifically, a reduced diameter portion 168 of posts 160 corresponding in shape and diameter to portions 102 of posts 90 is integral with an end portion 170 of posts 160 corresponding to end portion 104 of posts 90. The substantially identical shape and diameters of these corresponding portions of posts 160 and 90 enable the use of retaining assemblies 106 with any one or more of posts 160 and 90. This affords interchangeability and greatly reduces the cost of manufacture of system 10. Another obvious advantage resides in the ability of the fabricator to utilize labor of lesser skills, and affords relative ease of disassembly and reassembly of system 10, and more particularly assembly 72, for inspection and cleaning purposes.

Severing plate 88 is formed with two segment openings of importance in the operation of system 10, and molder/form cooler 14. More sepecifically, as best seen in FIG. 5 in phantom outline, a trapezoidal-shaped opening 172 corresponding to an inlet opening within severing plate 88 extends a predetermined arcuate distance so as to project over the areas of approximately 10 openings 154 formed in the lower plate 82. An outlet opening 174 is formed through severing plate 88 and is shown in FIG. 5 by the phantom outline of the generally rectangular shape 174. The over-all area of opening 174 is sufficient to cover three openings 154 within plate 82, and it is through opening 174 that molded and cooled product is positively ejected, as will become more apparent from the description hereinbelow.

As best seen in FIG. 2, an overhead support 176 consists of a vertical column 178 integral with vertical member 136 and having a substantially horizontal overhang 180. A hydraulically operated ejecting assembly 182 is supported in a predetermined location by overhang 180 above upper plate 80 and the uppermost surfaces of posts 160. Ejecting assembly 182 includes a hydraulic cylinder 184 which is fed by a hydraulic line 186 and from which a plunger member 188 extends downwardly into contact with ejecting plate 190. A pair of guide rods 192 likewise extend vertically into contact with ejecting plate 190 and serve, among their other purposes, to maintain a substantially horizontal disposition of ejecting plate 190 at an orientation that is relatively important. Ejecting plate 190 is preferably substantially rectangular in overall shape, with its overall shape corresponding to the shape of outlet opening 174, and with the axis of plate 190 corresponding to the longitudinal axis of rectangular opening 174.

Overhead support 176 and overhang 180 further support a fluid inlet tube 194 which extends vertically downward from overhang 180 to a position within chamber 92 best seen in FIGS. 2 and 6. Cold water is introduced into chamber 92 through inlet tube 194 to replenish and circulate what comprises fluid 144 within chamber 92. A fluid exhaust or outlet tube 196 extends downwardly from overhang 180 to the position shown in FIGS. 2 and 6. Outlet tube 196 extends downwardly though central opening 142 in plate 80 to a predetermined level within chamber 92. By the introduction of fluid at the outer circumference of assembly 72 and its suction or removal through tube 196 at a point substantially central with respect to the overall assembly 72, an inward flow of cold fluid around and in contact with tubes or forms 146 is effected, with the temperature of fluid 144 within chamber 92 being maintained at a preselected level.

FIG. 8 shows in a relatively large cross-sectional view a detail of a portion of the driving mechanism that drives shaft 42 in the intermittent, one-way rotary movement referred to above. More specifically, the back-and-forth movement of connecting plate 44 and its interconnection with connecting rod 66 are shown in more detail. The extremity 198 of rod 66 is shown in FIG. 8 as being pivotally interconnected with connecting plate 44 by means of a bolt 200, washer 202 and nut 204 fastening arrangement which allows for relative pivotal movement between extremity 198 and connecting plate 44. At the opposite end of connecting plate 44, a hub 206 which is integral with plate 44, such as by welding or other conventional fastening means, and encircles shaft 42. Ratchet teeth 208 are formed in an upper extremity or portion integral with hub 208, and these ratchet teeth cooperate with ratchet teeth 210 of an opposing hub 212 which likewise surrounds shaft 42. It is hub 212 that is keyed to shaft 42 by means of key 214. A pedestal 216 supports an upper plate 218 upon which a helical compression spring 220 is situated. The windings of helical spring 220 engage upper plate 218 at the lower extremity thereof and extend upwardly to and into contact with lower surfaces of connecting plate 44. It is the upward biasing force of compression spring 220 that maintains cooperative meshing engagement between opposing ratchet teeth 208 and 210.

Before describing the operation of molder/form cooler 14, another detail disclosed in FIGS. 10 and 11 should be referred to as a preferred or optional means of captively holding upper plate 80 in its assembled position best shown in FIGS. 2 and 6. A locking clip assembly 222 is shown in both of these figures as consisting of a support plate 224 which is fixed to upper plate 80 by means of a threaded bolt 226 which extends through support plate 224 into threaded engagement with tapped holes within plate 80. A two-pronged retaining clip 228 formed with legs 230 and 232 is further formed with an upwardly extending flange 234 which may be engaged by the fingers or hand of the user. Legs 230 and 232 are captively and slidably held within slots formed in support plate 224 and are provided with opposed tapered extremities 236 and 238 which are adapted to engage, and by-pass a reduced diameter portion 240 of a head 242 of a post 244. A stepped diameter portion 246 intermediate the full diameter portion of post 244 and reduced diameter portion 240 thereof provides a shoulder 248 which may be engaged by upper plate 80.

It is contemplated that the locking arrangement of locking clip assembly 222 and the configuration of post 244 may replace that previously described for each of posts 90 such that the user may use either spring-biased retaining assemblies 106 or locking clip assembly 222, or both, in conjunction with the posts 90 that interconnect and hold upper plate 80 with lower plate 82. The present invention contemplates any combination of these locking assemblies for use with posts 90. In use, the user merely engages flange 234 with his hand or a tool and by moving flange 234 to the right, as shown in FIGS. 10 and 11, legs 230 and 232 will become disengaged from portion 240 of the post such that plate 80 may be lifted with clearance from post 244 (corresponding to post 90). When replacing top plate 80 and wishing to lock same in place, flanges 234 may be engaged on the right side this time such that extremities 236 and 238, with their tapered ends, will engage and by-pass portion 240 until it is held as best seen in FIGS. 10 and 11.

In operation, molder/form cooler 14 receives cooked cheese from either a cooker 12 or an accumulator 24 or, in the case where the user of this equipment is utilizing his own cooking equipment, the existing cooker on his premises. The cooked cheese is elevated through inlet opening 172 formed in severing plate 88 and thereafter through the openings 154 which immediately overlie opening 172. The cheese is forced upwardly under a predetermined but controlled pressure such that, as best seen in FIG. 6, cheese (designated reference character 250) enters each of the tubes or forms 146 secured to the openings 154 such that this upward force of the cheese entering the tubes or forms causes plunger plates 158 to be contacted and accordingly elevated. Of course, as plates 158 are elevated as a result of the upward moving force of cheese 250 entering the molds or forms 146, posts 160 are likewise elevated to a predetermined and preselected elevation dictated by interference between upper ends 166 of sleeves 164 and the bottom surfaces of upper plate 80. FIG. 6 best illustrates the uppermost extent of travel of posts 160 and their associated plunger plates 158, as dictated by the length of each sleeve 164 and this interference of upper ends 166 with plate 80.

Once the confines of tubes 46 below plunger plates 158 are filled with cheese 250, there is little or no compression of the cheese that has already entered the molds or forms 146, since excessive pressure would force moisture and fat from this cheese. It must be kept in mind that throughout this continuous process, the assembly 72 of molder/form cooler 14 is rotating at a predetermined and selected speed in an intermittent-type movement through shaft 42 and the drive means therebelow. As each opening 154 with its associated tube or form 146 and its plunger plate 158, rotates into a position above opening 172, the tube or form 146 receives cooked cheese 250 in a manner as has already been described.

As soon as cheese 250 enters the forms or tubes 146, a cooling process takes place whereby heat within cheese 250 is transferred through the walls of tubes or forms 146 to the circulating and surrounding reservoir of fluid 144 contained within chamber 92. During this time, as the form 146 with cheese therewithin rotates from opening 172 in a counterclockwise direction about the axis of rod 122 until it overlies outlet opening 174, a considerable amount of heat is transferred from cheese 250 within the forms, such that the product is able to maintain the shape of the form within which it is contained.

Once cheese 250 enters tubes or forms 146, the side shapes of the product are defined by the inner contours of tubes or forms 146. The upper end of the product is defined by interference with plunger plates 158, while the lower end of the product is first defined by a severing action between moving lower plate 82 and severing plate 88, and thereafter the presence of severing plate 88 along which the product at its lower end moves. Once tubes 146 containing product that has been formed, molded and cooled reaches a point of clockwise travel whereby these tubes overlie outlet opening 174, ejecting assembly 182 automatically is caused to be lowered as a result of hydraulic pressure within cylinder 184. The downward movement of ejecting plate 190 results in contact between the ejecting plate 190 and the uppermost extremities of portions 170 of posts 160 which are associated with the tubes or forms 146 immediately over the outlet opening 174. The result is a downward ejecting movement of plunger plates 158 with a resulting forcing of molded and form-cooled product within tubes 146 through and out from outlet opening 174 to another portion of system 10. In the preferred embodiment of the present invention, molded and form-cooled product is ejected positively from molder/form cooler 14 into a cooling bath where the product is yet further cooled on its way to further processing. While the molding and form cooling is taking place within chamber 92, the fluid 144 first introduced through tube 194 is removed by means of tube 196 such that the average temperature of fluid within chamber 92 may be maintained at a preselected temperature and the fluid may be cleaned, if desired.

Figure 3:
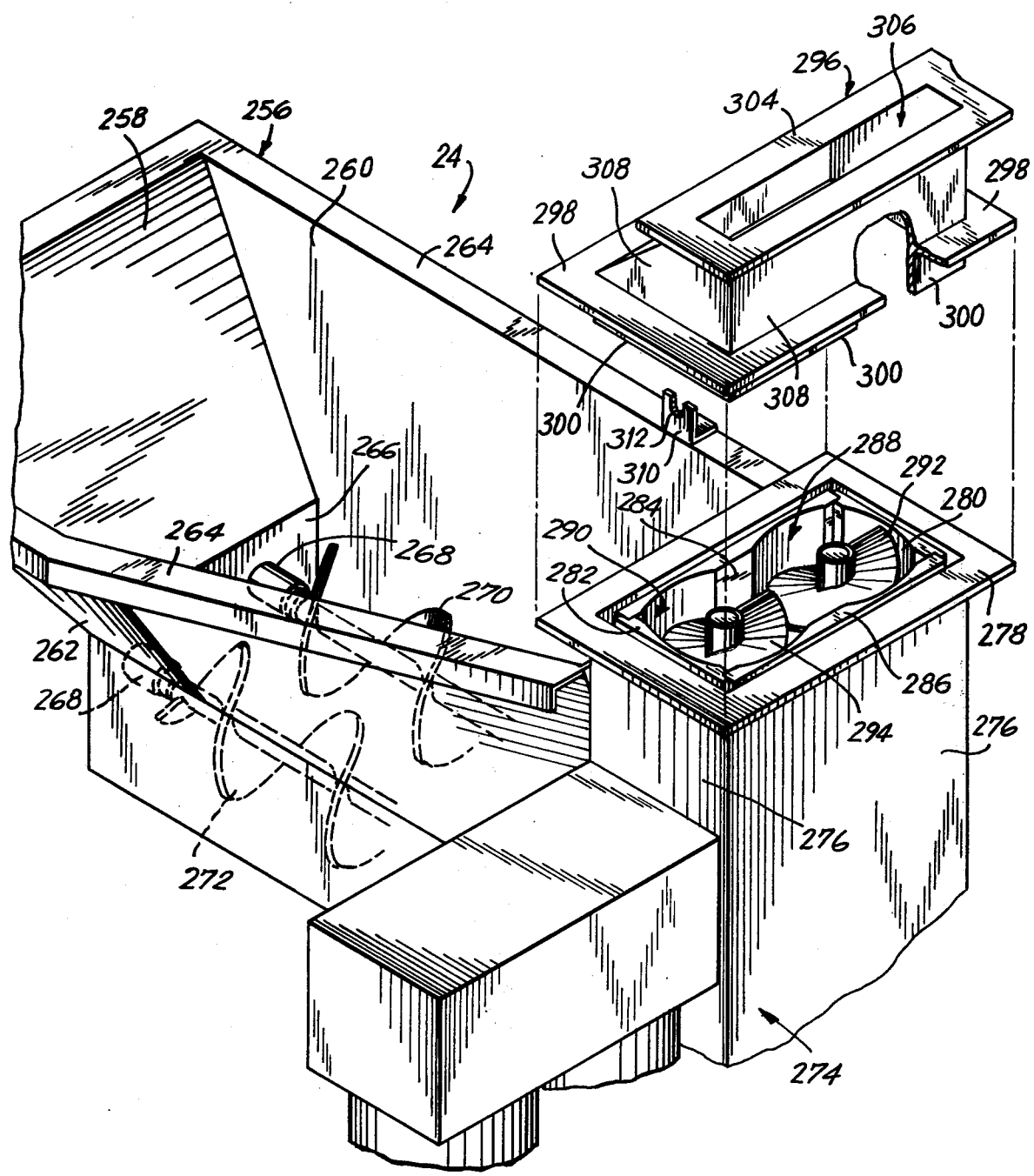
FIG. 3 is an enlarged fragmentary exploded-type perspective view of a portion of the accumulator shown in FIG. 2.
Figure 9:
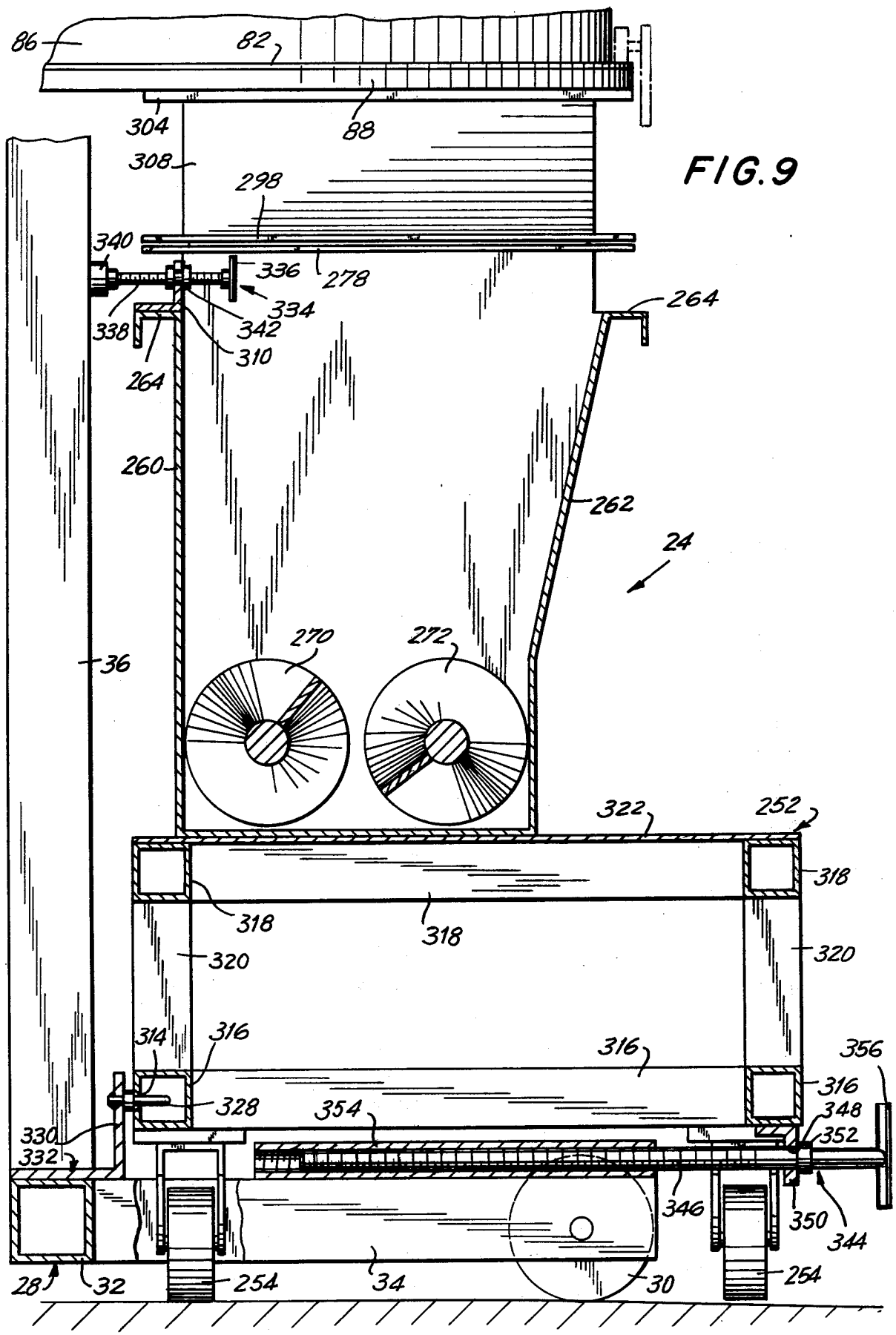
FIG. 9 is a fragmentary sectional elevational view taken along the line 9—9 of FIG. 2.

The reader's attention is now directed to an element or piece of equipment within system 10 known as an accumulator, and previously referred to as accumulator 24. At the risk of repetition, accumulator 24 serves as its purpose to accumulate cheese that has been cooked in a cooker, and serves to convey the cooked cheese in a predetermined manner to and into molder/form cooler 14. As best seen in FIGS. 2, 3 and 9, accumulator 24 comprises a supporting frame 252 mounted upon wheels 254 for purposes of mobility. An accumulating tank 256 includes a sloped or inclined end wall 258 which is integral with side walls 260 and 262. A ledge 264 extends around the upper periphery of end wall 258 and side walls 260 and 262.

Inclined end wall 258 joins side walls 260 and 262 in a substantially vertical base wall 266, to which bearing collars 268 are integrally secured.

A pair of horizontal augers 270 and 272 extend from base wall 266 with their ends journalled within bearing collars 268 toward a vertical chute 274 at the end of tank 256 opposite walls 258 and 266. Vertical chute 274 includes four walls 276 which extend upwardly to a support flange 278.

In a preferred embodiment of this invention, four Teflon forms 280, 282, 284 and 286 are disposed against the four walls 276 comprising chute 274, their inner configurations defining a pair of vertical cavities 288 and 290 therebetween. A pair of vertically extended augers 292 and 294 are situated within vertically extending cavities 288 and 290, respectively. The outer periphery of each of augers 292 and 294 lie proximate the inner surfaces defining cavities 288 and 290.

A transition chute assembly 296 comprises a base flange 298 integral with downwardly extending walls 300, which fit within notches 302 between Teflon forms 280, 282, 284 and 286 at their upper extremities and the uppermost portions of walls 276. Downwardly extending walls 300 define an overall opening corresponding to the opening defined by walls 276, while an upper flange 304 of transition chute assembly 296 surrounds an exit opening 306 of generally rectangular shape, and of a size smaller than the opening surrounded by flange 278. The use of the word "transition" in defining transition chute assembly 296 is for purposes of emphasizing the transition between the larger opening defined by downwardly extending walls 300 and upper exit opening 306. Walls 308 extend integrally between flanges 298 and 304 and, as can be seen in FIG. 3, comprise in at least three cases, extensions of walls 300. The inclined fourth wall is the single exception.

An indexing angle 310 is situated at a preselected location atop and integral with ledge 264 and angle 310 is preferably formed with a locating notch 312 in the vertical wall thereof. This is best seen in FIG. 3 and FIG. 9, wherein an indexing opening 314 is formed through horizontal tube member 316, which is one of five lower frame tubes interconnected to five upper horizontal frame tube members 318 interconnected by vertical support columns 320. The box-like hollow frame structure comprising members and columns 316, 318 and 320 supports a platform 322 on which tank 256, chute 274 and electrical-fed control means 324 and 326 are situated.

In a preferred embodiment of this invention, accumulator 24 is held fixed with respect to and integral with molder/form cooler 14 by means of indexing attachments that will now be described in more detail. Frame 252 of accumulator 24 is indexed with respect to frame 28 of molder/form cooler 14 by means of an indexing pin 328 which is welded to the vertical flange 330 of an angle member 332. Indexing pin 328 is adapted to penetrate and extend through indexing opening 314 formed through a horizontal tube member 316, best seen in FIG. 9. One or more such indexing pins 328 may be utilized for this purpose.

Nearer the upper end of accumulator 24, a fastening assembly 334 consisting of a handle 336 secured to a length of threaded rod 338 is adapted to threadedly engage the female threads of a boss 340 which is integral with vertical column 36 of molder/form cooler 14 corresponding to column 36 shown in FIG. 2. Rod 338 is adapted to extend through notch 312 formed in angle 310, and collars 342 integral with rod 338 serve to bring the accumulator 24 and its angle 310 closer to column 36 when fastening assembly 334 is tightened by means of handle 336 via threading into boss 340.

A counterpart of fastening assembly 334 at the top of accumulator 24 consists of a fastening assembly 344 beneath frame 252 of the accumulator 24. An elongated threaded rod 346 extends through an opening 348 formed in a downwardly extending angle member 350 welded to the underside of a horizontal tube member 316. A collar 352 integral with rod 346 abuts the vertical leg of angle member 350. A threaded receptacle or pipe 354 is shown in FIG. 9 secured to the upper surface of a horizontal frame member 34 of molder/form cooler 14. By manipulating a T-shaped handle 356 integral with rod 346, and rotating same in a clockwise direction, the bearing forces of collar 352 against angle member 350 will cause indexing pin 328 to be drawn into indexing opening 314 as a result of the threaded engagement between rod 346 and its threaded receptacle 354. As in the case of fastening assembly 334, there may be more than one fastening assembly 344.

In operation, accumulator 24 and its inclined end wall 258 receive predetermined quantities of partially or fully cooked cheese, which is deposited within tank 256. Augurs 270 and 272 gently urge the cheese and work same toward vertical chute 274, where vertical augurs 292 and 294 gently raise the horizontally conveyed cheese upwardly within formed vertical cavities 288 and 290, and thereafter into and through transition chute assembly 296, whereupon cheese leaving exit opening 306 is introduced into and through inlet opening 172 of the molder/form cooler 14. Thereafter, the cheese is molded and form cooled in the manner described in more detail above in connection with the operation of molder/form cooler 14.

It is contemplated with the present invention that the speeds of both horizontal augurs 270 and 272 and vertical augurs 292 and 294 may be independently varied by the user with the aid of control means 324 and 326 via geared arrangements partially shown in FIG. 2. In this way, the pressure and conveying speeds associated with the conveying of cheese within accumulator 24 is fully controllable in order to maximize the characteristics of the product desired by the user of this equipment.

At this point in this specification, a number of observations are worth being made such that the reader will be able to appreciate advantages afforded by the novel features of the present invention. For example, it should be noticed that in the case of accumulator 24, cooked cheese 250 is conveyed vertically by means of vertical augurs 292 and 294 of the accumulator directly into the molds or forms 146 of the molder/form cooler 14. The cheese 250 does not have to make right angle bends in order to get to the molds and, thus, moisture and fat (both desirable constituents) are not lost as is ordinarily the case in conventional equipment as a result of the cheese being forced through restrictions. Utilizing accumulator 24, one is actually able to increase the moisture content of the cheese being conveyed. In conventional or known equipment, fat is lost from the cheese or the curd during the cooking process at elevated temperatures that release the fat too easily, and fat is also lost by overworking of the cheese or bending and kneading same, such as by making right angle turns and squashing it.

It should also be noted that the rotational directions of augurs 270 and 272 are opposite one another, but the augurs are not overlapping so that the cheese is not overworked. In this way, undesirable creases in the cheese are avoided.

Another feature afforded by the present invention, and illustrated in FIG. 3, resides in the transition chute assembly 296 which provides a very gradual reduction of the mass of cheese being vertically conveyed into the shape that will enter the opening within severing plate 88 of the molder/form cooler 14. Throughout the vertical conveying of the cheese 250 through chute 274 and into the molder/form cooler, a sanitary condition is maintained, with the drive taking place at a higher level than the product or the water or anything that is in the accumulating tank. The interlocking relationship of the four Teflon inserts or forms 280, 282, 284 and 286 are kept together with stainless pins such that there are no wrenches or any kind of tools required to break the four forms apart The four forms, just described, fall apart when desired and are placed together again instantly such that a totally sanitary and easily cleaned assembly is provided. The inner contour of cavities 288 and 290 insure upward movement of the cheese through chute 274 without any meshing of augurs 292 and 294. A meshing would force fats and moisture out of a product, which is undesirable. The forms 280, 282, 284 and 286 are preferably formed of Teflon which has very low friction properties and which provides a smooth surface to which the product will not stick. It is contemplated that the material utilized may include 1900 series, high molecular structure plastic, which is USDA approved.

It should also be noticed here that the slot around forms 280, 282, 284 and 286 within which vertical walls 300 extend provide a means of securing transition chute assembly 296 to chute 274 without the need of separate fasteners. With this type of arrangement, one experiences a "floating" arrangement which is self-adjusting and self-aligning. This allows the top of assembly 296 to be a floating directional structure attached to the bottom of severing plate 88 so as to prevent the bypassing of any leaking fats or moistures.

In the case of the molder/form cooler 14, a number of items are worth mentioning here. Firstly, the forms or tubes 146 shown in the drawings may be replaced by other forms of varying sizes and shapes so as to afford the user the ability to mold and form cool product of a variety of shapes and sizes. The tubes or forms 146 have a cross sectional shape that define the cross sectional shape of the product being molded. It should also be emphasized here that by varying the length of sleeves 164, the upward travel or movement of plunger plates 158 may be controlled so as to provide cheese product of a variety of predetermined and selected lengths. It is contemplated that this upward movement of plunger plates 158 may also be controlled without changing the sleeves 164 via the addition of washers. In this way, the precise weight of the molded product can be established in situations where variations in the specific gravity or density of the cheese will vary from one part of the country to another as a result of the milk product utilized.

The entire molder/form cooler 14 is sanitary, with all of the molds in water such that when the hot cheese enters the molds through the opening in severing plate 88, the cheese is sufficiently warm enough to shape itself into the curves and corners of each of the molds. With uniformity of tubes or molds 146, the product will be consistent in its size and weight.

The temperature of the water or fluid within chamber 92 will vary from one customer to another. However, a normal running condition will require water at temperatures varying from 38° to 48° F. This water will take great amounts of heat from the product contained within the tubes or forms 146 such that when the product is positively ejected as a result of the downward movement of ejecting plate 190 under the influence of either hydraulic fluid or air pressure, the product is positively ejected into either cold water or cold brine, thereby eliminating handling by human personnel.

In equipment that has been installed and tested approximately one year ago, speeds of between 60 and 120 pieces of product per minute have been accomplished without personnel or forms or the handling of cheese. Since we are cooling the product within the molds or forms 146 during the molding process, by the time the product is positively discharged or ejected, the integrity of the shape is held very closely to that which is desired.

One using this equipment does not get deformations or changes in the shape of the cheese after it is discharged from the tubes or forms 146.

The embodiments of the invention particularly disclosed and described are presented merely as examples of the invention. Other embodiments, forms and modifications of the invention coming within the proper scope and spirit of the appended claims will, of course, readily suggest themselves to those skilled in the art.

What is claimed is:

1. A cheese processing system comprising, in combination: means for feeding product to an elevating location, means disposed at said elevating location for elevating the product to bottommost portions of and thereafter into a plurality of forms at an input station, means for rotating the forms which contain product form said input station along a path to a discharge station, fluid means for cooling outer surfaces of said forms without contacting product therewithin, and positive ejection means for urging substantially packagingready formed and cooled product from said forms at said discharge station.

2. A system according to claim 1, further comprising a rotating table assembly supported at a predetermined elevation and including said plurality of forms, said forms being substantially hollow and having inner configurations corresponding to a predetermined desired product shape, said positive ejection means including a plunger member associated with each of said forms, and force means disposed at said discharge station for urging said plunger members into said forms, thereby positively displacing said product.

* * * * *